Patented Apr. 27, 1943

2,317,685

UNITED STATES PATENT OFFICE 2,317,685

METHOD OF WATERPROOFING INORGANIC HYDROUS OXIDE BODIES, AND PRODUCT

Ernst A. Hauser, Cambridge, Mass., assignor to Research Corporation, New York, N. Y., a corporation of New York No Drawing. Application April 3, 1941, Serial No. 386,743

14 Claims. (Cl. 117—123)

This invention relates to the waterproofing of inorganic hydrous oxide bodies and more particularly to a method of improving the water resistance, humidity resistance and dielectric properties of bodies produced by the evaporation of aqueous dispersions of water swellable hydrous oxides such as bentonite.

In my Patent No. 2,266,636, dated December 16, 1941, I have described the production of flexible, coherent, self-supporting solid bodies, such as films, filaments, coatings and the like from colloidal crystalline inorganic hydrous oxides which contain structural water and are capable of swelling when brought into contact with water to form plastic hydrogels and exhibit base exchange properties. According to said patent, the hydrous oxide, e. g. bentonite, is suspended in water to form a sol or gel containing, for example, from 0.5 to 15% of the hydrous oxide. The resulting sol or gel is refined if necessary or desirable to remove coarse particles or impurities, and is then formed into a film, filament, coating or the like, and dried.

In another Patent No. 2,266,637, dated December 16, 1941, I have described the waterproofing of the hydrous oxide bodies by treatment with certain salts and compounds, such as lead acetate, potassium hydroxide, etc., having cations of at least 2.64 Angstrom units diameter. In said patent I have attributed the waterproofing action of the treating compounds entirely to the cations thereof and have indicated that the anions of said compounds have practically no effect upon the waterproof properties of the hydrous oxide bodies.

Now I have found that the properties, particularly the waterproofness, humidity resistance and electrical properties of such hydrous oxide bodies, may be improved by treatment with the salts, which, upon heating, are capable of forming basic salts, of cations having a diameter greater than 2.64 Angstrom units with anions of organic acids containing up to about 6 carbon atoms per molecule. Suitable cations are those of lead, potassium, barium, strontium, rubidium, cesium, thallium, gold, and ammonium, and suitable anions are those of the fatty acids containing up to 6 carbon atoms, e. g. formic, acetic, propionic, butyric, caproic and valeric. Specific examples of such salts or soaps are lead formate, lead acetate, lead propionate, lead n-butyrate, lead isobutyrate, lead n-valerate, lead iso-valerate, lead methyl ethyl acetate, lead tri-methyl acetate, lead n-caproate, lead iso-caproate, lead tri-methyl propionate, lead methyl ethyl propionate, lead methyl propyl acetate and lead dimethyl ethyl acetate.

Hydrous oxides with which the present invention is concerned are further characterized by the fact that the individual crystallites thereof exhibit at least one surface plane in the form of a silica sheet having hexagonal voids with a diameter of the inscribed circle of about 2.6 Angstrom units.

Certain characteristics of the treating agents, other than the size of the ions, come into consideration, such as their solubility in water and in organic solvents, their hydrophobic character and their dissociation or ionization characteristics. I have further observed that among operable compounds variation in their effect upon the hydrous oxide bodies may be correlated to the number of carbon atoms in the anions thereof. Thus it has been found that the humidity resistance of the treated hydrous oxide body increases with the number of carbon atoms in the anion up to a maximum at 4 carbon atoms, and that although anions containing 5 and 6 carbon atoms are useful for waterproofing, there is no further appreciable increase in humidity resistance when the number of carbon atoms in the anion is greater than 4. On the other hand, the strength of the treated hydrous oxide body decreases and its brittleness increases when the number of carbon atoms in the anion of the treating compound is increased above 4. Treating compounds in which the anion contains more than 6 carbon atoms are of no practical utility.

The treatment of the hydrous oxide body consists essentially in dissolving the treating agent in a suitable solvent, such as water, methyl or ethyl alcohol, and immersing the hydrous oxide body in the solution for a suitable period of time, removing the body, drying and baking it.

The hydrous oxide body must be one which is responsive to the treatment, i. e. one which has not been heated to such a high temperature as to expel water from the lattice structure and collapse it so that it is no longer capable of penetration by the ions of the treating agent. In the case of bodies formed of bentonite, temperatures above about 432° C. have been found to have this effect. It is preferred generally to treat the bodies after drying at a temperature above 120° C. At temperatures above 120° C. and up to about 432° C. the hydrous oxide bodies are dehydrated but remain still capable of absorbing water and of being acted upon by the waterproofing agents, whereas at temperatures substantially above 432° C. the bodies lose this ability to absorb water and to be acted upon by the treating agents.

The solvent to be used for applying the treating agent depends upon the solubility of the treating agents. Salts, such as lead acetate, are soluble in water, but salts of the higher fatty acids, such as lead butyrate, are relatively insoluble in water, so that other solvents, such as alcohol, must be used.

It is desirable to treat the hydrous oxide body with a solution of the treating salt of high concentration, preferably at or closely approaching the saturation point, and it is advantageous in many instances to employ elevated temperatures for increasing the solubility and concentration of the treating salt in the solvent. High concentrations of the treating salt in the treating solution appear to be essential to the production of useful results within a reasonable treating time. The character of the solvent used for applying the treating salt to the hydrous oxide body has not been found to be critical. In general it appears that any solvent capable of dissolving the treating salt, and which does not react with, decompose or alter the treating salt, may be employed.

After soaking the hydrous oxide body in the solution of the treating salt for a suitable period of time, the hydrous oxide body is removed from the solution and simply drained and dried or washed and dried and can then be baked at a temperature sufficient to decompose the treating salt to the corresponding basic salt. Thus, in the case of lead propionate, the bentonite film is soaked for about 12 hours in a 30% solution of the salt in water, drained and dried at about 70° C. for about 8 hours, and then baked at about 165° C. for about 24 hours. The neutral lead salt can be decomposed by the heating into the relatively water insoluble basic or dibasic lead salt. The temperatures and times of heating are not critical. In general, heating for a longer time at a lower temperature or for a shorter time at a higher temperature (up to about 250° C.) will give the same results.

Films treated as described are waterproof, that is, they will not swell or absorb water when immersed in water. This non-swelling property is attributed to base exchange of the cation of the treating salt, e. g. lead, with the sodium ion of the hydrous oxide. At the same time the films are rendered resistant to the absorption of moisture from the atmosphere and their power factor and electrical resistance are improved, these latter effects being attributed principally to the anion of the treating salt. These properties tend to improve as the number of carbon atoms in the anion of the treating salt increase up to 4, and this imrovement is attributed to the increasing hydrophobic properties of the anions as the number of carbon atoms increase. Thus a bentonite film treated with lead acetate is found to have excellent electrical characteristics when the humidity is low, but at higher humidities the film absorbs moisture and the electrical properties deteriorate. Films treated with lead propionate are much more resistant to high humidity than the lead acetate treated films and lead butyrate treated films are still better than the lead propionate treated films. The humidity resistance of the treated films appears to be proportional to the water insolubility of the salt used as treating agent. The humidity resistance can be further improved by converting the treating salt into the corresponding basic salt by baking the treated dried film. Another point to be observed, however, is that the electrical properties of the treated films are not strictly proportional to the amount of humidity absorbed by the films. Thus a lead acetate treated film which has picked up .1% of moisture by absorption from the atmosphere will have a power factor of 10.5%, whereas an identical film which has been treated with lead iso-valerate and has picked up 1% of moisture by absorption from a humid atmosphere will have a power factor of only 4%. It appears that the electrical properties of the treated films depend upon the character, probably the degree of dissociation, of the treating salt. In the absence of moisture, the electrical properties of the films are a function of the electrical properties of the treating salts. For best results, therefore, the treating salt should be one which gives the treated film a high humidity resistance and which itself has good electrical properties.

In the foregoing description, reference has been made more particularly to the use of the lead salts of fatty acids containing up to 6 carbon atoms. Such lead salts readily are prepared by reacting lead carbonate or oxide with the corresponding fatty acids. Lead salts containing 4 or more carbon atoms in the anions are water-insoluble, heavy, viscous oils but are soluble in alcohol and may be applied to the hydrous oxide films in that form. Lead as the cation of the treating salts shows an excellent waterproofing action, the salts are readily prepared and applied and upon heating readily form water-insoluble basic salts. The invention is, however, not limited to the lead salts, but embraces the use of the salts of the organic acids containing up to 6 carbon atoms with other metals having an ionic diameter greater than 2.64 Angstrom units. It may be noted that both theoretical and practical considerations indicate that lead butyrate stands at or near the top of the entire group of usable salts with respect to the waterproofness and humidity resistance of the films produced.

The effects produced with anions having different numbers of carbon atoms, i. e. different lengths of the carbon chain, indicate that the anion penetrates the film structure and acts as a bond, thereby strengthening it.

Decreased strength and increased brittleness of the hydrous oxide body, found when the anion of the treating agent possesses 5 or more carbon atoms, is presumably due to the size of the anion, which results in setting up strains in the lattice structure.

The invention is illustrated by the following specific examples:

1. Lead propionate was prepared by reacting propionic acid with lead carbonate. Since lead propionate is soluble in water, a solution of about 30% concentration in water was prepared and hydrous oxide films made from bentonite and dried at 120° C. were immersed in the solution maintained at a temperature of 90° C. for 8 hours. After removal from the solution, the films were washed with water, dried and then baked for 8 hours at 110° C. and then for 8 hours at 150° C.

2. Lead butyrate, a heavy viscous oil, was prepared by reacting lead carbonate with butyric acid. The salt has a limited solubility in water and was therefore dissolved in methyl alcohol to form a 65% solution. The hydrous oxide film was immersed in the solution, maintained at 60° C. for 12 hours, then removed and washed with methyl alcohol and dried and baked for 4 hours at 60° C., 4 more hours at 110° C., and finally for 12 hours at 165° C.

3. Lead iso-valerate was prepared by reacting iso-valeric acid with lead carbonate and dissolved in methyl alcohol to the production of a 50% solution. The hydrous oxide film was soaked in this solution at 60° C. for 12 hours, washed, dried and baked for 4 hours at 60° C., 4 hours at 110° C., and finally for 12 hours at 165° C.

The invention has been described by using salts which are capable of forming water-insoluble basic salts upon being treated, but it is not limited to a treatment of the hydrous oxide involving a heat decomposition of the salt. Heating to form the water-insoluble basic salts is practically essential in the case of water soluble salts such as lead acetate, but when the treating salt, such as lead butyrate, is naturally insoluble in water, then baking to form the basic salt is unnecessary.

Summarizing, the treating salt must be one having a cation of the proper size, i. e. a diameter greater than 2.64 Angstrom units, and capable of base exchange with sodium and an anion containing not more than 6 carbon atoms. It must be insoluble in water or capable of forming a water insoluble basic salt upon heating. It should be hydrophobic and should have a low degree of ionization of dissociation.

I claim:

1. Method of waterproofing and improving the humidity resistance and electrical properties of bodies composed of colloidal crystalline inorganic hydrous oxides containing structural water and capable of swelling when brought into contact with water to form plastic hydrogels and exhibiting base exchange properties and the individual crystallites of which exhibit at least one surface plane in the form of a silica sheet having hexagonal voids with a diameter of the inscribed circle of about 2.6 Angstrom units, said method comprising contacting such a body with a solution of a salt the cation of which is of such size that it cannot enter into the crystal lattice of the hydrous oxide and the anion of which contains a chain of from 1 to 6 carbon atoms, said salt being capable of forming a water-insoluble basic salt upon being heated.

2. Method as defined in claim 1 in which the hydrous oxide body is treated with an aqueous solution of a water soluble salt, dried and heated to a temperature and for a time sufficient to convert the water-soluble salt into the corresponding water-insoluble basic salt.

3. Method as defined in claim 1 in which the hydrous oxide body is treated with a solution of a water insoluble salt in an organic solvent.

4. Method as defined in claim 1 in which the hydrous oxide is bentonite.

5. Method as defined in claim 1 in which the treating salt is a salt of a fatty acid.

6. Method as defined in claim 1 in which the treating salt is a salt of lead.

7. Method as defined in claim 1 in which the treating salt is lead butyrate.

8. A body composed of a colloidal crystalline inorganic hydrous oxide containing structural water and capable of swelling when brought into contact with water to form a plastic hydrogel and exhibiting base exchange properties and the individual crystallites of which exhibit at least one surface plane in the form of a silica sheet having hexagonal voids with a diameter of the inscribed circle of about 2.6 Angstrom units, said body being waterproof and having a high humidity resistance due to the presence therein of a salt the cations of which are of such size that they cannot enter into the crystal lattice of the hydrous oxide and the anions of which contain a chain of from 1 to 6 carbon atoms, said salt being capable of forming a water insoluble basic salt upon being heated.

9. Waterproofed inorganic hydrous oxide body as defined in claim 8 in which the salt is a basic salt.

10. Waterproofed inorganic hydrous oxide body as defined in claim 8 in which the salt is a lead butyrate.

11. Method as defined in claim 1 in which the body, after the treatment with the solution of the salt is heated to a temperature and for a time sufficient to convert the salt into the corresponding basic salt.

12. A body as defined in claim 8 in which the hydrous oxide is bentonite.

13. A body as defined in claim 8 in which the hydrous oxide is bentonite and the salt is a water insoluble lead salt of a fatty acid.

14. A body as defined in claim 8 in which the hydrous oxide is bentonite and the salt is lead butyrate.

ERNST A. HAUSER.